United States Patent [19]
Cates et al.

[11] 3,782,453
[45] Jan. 1, 1974

[54] SIPHON BREAKING VENT MANIFOLD FOR MULTIPLE PASS HEAT EXCHANGER

[75] Inventors: Robert E. Cates, Leawood, Kans.; Robert M. Mitchell; James R. Houx, both of Kansas City, Mo.

[73] Assignee: The Marley Company, Mission, Kans.

[22] Filed: June 19, 1972

[21] Appl. No.: 264,148

[52] U.S. Cl.............. 165/138, 137/124, 137/142, 165/122, 165/144, 261/23 R, 261/DIG. 11
[51] Int. Cl............................................. F28f 9/26
[58] Field of Search................ 165/122, 144, 138; 261/23 R; 137/124, 126, 127, 142

[56] References Cited
UNITED STATES PATENTS
3,635,042   1/1972   Spangemacher................ 62/305 X Primary Examiner—Manuel A. Antonakas
Assistant Examiner—S. J. Richter
Attorney—Gordon D. Schmidt et al.

[57] ABSTRACT

Liquid cooling apparatus comprising a series of upright heat exchange structures, each of which is provided with a top header cooperable therewith to present a siphon piping loop for assisting in filling, draining and uniform liquid flow through the exchangers. A common vent manifold interconnects all of the headers to maintain nearly atmospheric pressure above the liquid level therewithin while required vent air is supplied through the bottom of at least one of the heat exchange structures. As a result, during filling of the exchangers, siphon action is initiated substantially simultaneously in conjunction with automatic closing of the venting conditions through the bottom of at least one heat exchanger to assure equal liquid flow distribution from the common supply to all of the headers and thereby the heat exchangers joined thereto.

9 Claims, 4 Drawing Figures

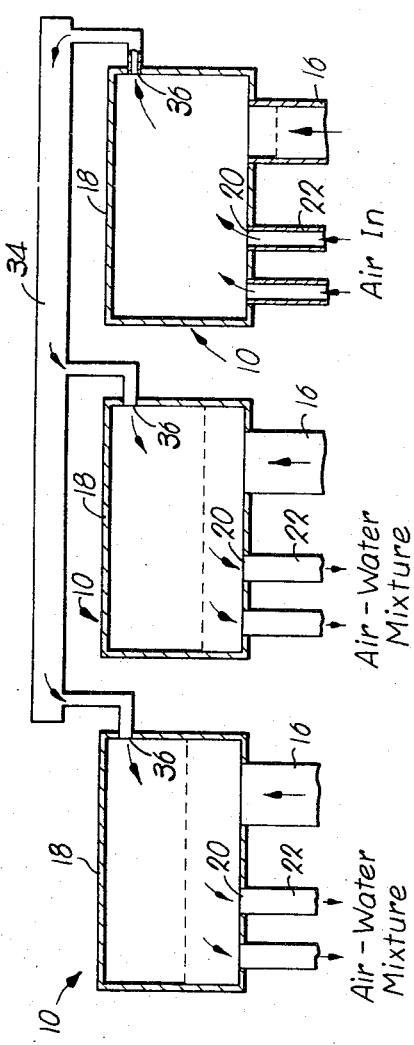
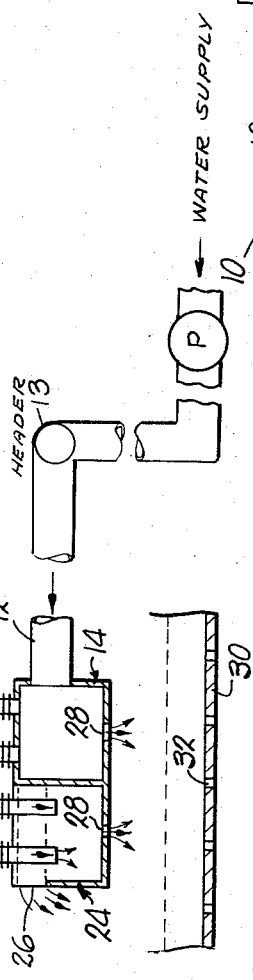
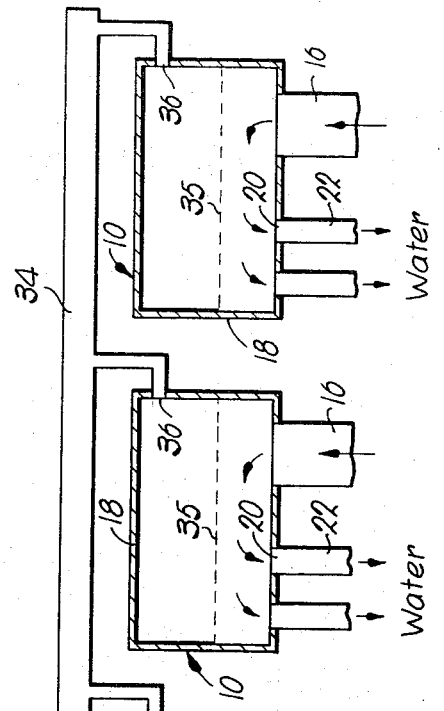
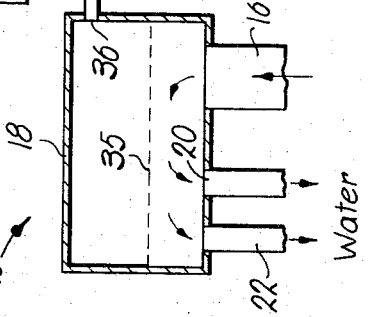
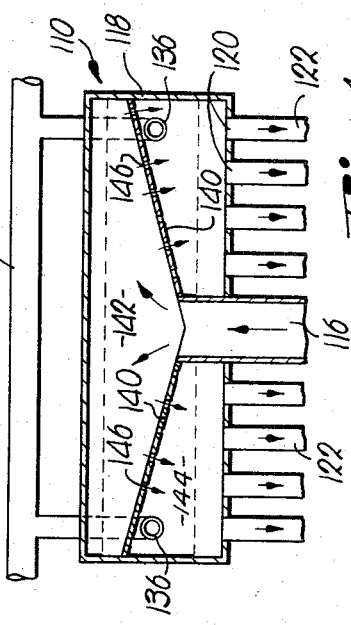

SIPHON BREAKING VENT MANIFOLD FOR MULTIPLE PASS HEAT EXCHANGER

This invention relates to liquid cooling apparatus of the type utilizing siphon action to assist in drawing the liquid to be cooled into an elevated header from where the liquid gravitates into an underlying region in heat exchange relationship with an ambient airflow.

Liquid cooling apparatus of the type described includes liquid cooling towers having overhead hot water headers into which the liquid to be cooled is supplied for subsequent gravitation along paths in direct or indirect heat exchange relationship with an ambient airflow from the atmosphere. Such towers utilize fans for inducing a flow of ambient air to cool the liquid or may be of the type having a hyperbolic stack creating a natural draft airflow in heat exchange relationship with the liquid. The ambient airflow may be in counterflow or crossflow relationship to the liquid flow, and certain liquid cooling apparatus may utilize a combination of crossflow and counterflow techniques as well as provide a combination of direct and indirect heat exchange between the liquid and the airflow.

Large capacity liquid cooling towers must incorporate a plurality of separate cells for maximum efficiency in handling and cooling the liquid in the manner described. The use of a plurality of cells provides greater adaptability of the cooling apparatus to varying conditions by permitting shutdown of some of the cells to compensate for varying weather factors and variations in the flow rate of the liquid being cooled. To this end each cell is provided with a separate, elevated header overlying an associated region for heat exchange between the liquid and the airflow, the headers drawing liquid from a common pipe supplying all of the cells. To minimize the pumping power required in supplying liquid to the cooling tower, it is known to provide an elevated header disposed to collect liquid therein in a manner to effect sealing thereof from the atmosphere so that a siphon action can be established to assist in lifting the liquid to the header.

In cooling apparatus utilizing a plurality of cells, certain ones of the cells may fill more rapidly with liquid than the other cells due to the relative distance between each cell and a common supply, differences in static resistance to the liquid flow to each cell, variations in dynamic characteristics of the inlet flow to each cell, and to variations in back pressure in the different cells resisting inlet liquid flow thereto. As a result, a siphon action may be established in one or more of the cells prior to establishment thereof in the remaining cells, resulting in a greatly increased liquid flow through the cells wherein the siphon action is established at the expense of starving the remaining cells. This improper division of inlet supply flow to the several cells greatly reduces cooling efficiency of the tower since there results, in effect, a reduction in the area of heat exchange between the liquid and the ambient airflow, the liquid being concentrated to flow only through the heat exchange regions associated with the cells in which siphon actions are prematurely established.

Accordingly, it is the most important object of the present invention to provide a gas-liquid cooling apparatus having a plurality of individual cooling cells for efficiently cooling liquid by distributing the same over a large area of exposure to a flow of coolant air, and wherein a siphon action is employed to at least partially draw the liquid into each cell to minimize the pumping power required in supplying liquid to the cells, and wherein the siphon actions in all of the cells are established substantially simultaneously to preclude liquid starvation in any of the cells and to provide proper division of the supply flow to all of the cells for maximum cooling efficiency by the apparatus.

Another important object of this invention is to provide a system which has efficient and economical operating characteristics by virtue of inclusion of a plurality of separate, closed headers each of which is capable of establishing a siphon action for assisting in drawing fluid to be cooled from a common supply to minimize pumping power required in delivering fluid as well as to distribute the liquid within respective areas associated with each header in heat exchange relationship with a cooling airflow to thereby provide a large heat exchange area between the liquid and the airflow for efficient cooling of the liquid, and wherein a common vent manifold for the headers is provided to maintain equal air pressure within the several headers to assure that the siphon actions are established substantially simultaneously and thereby create a proper division of liquid flow from the supply to each of the headers for maximum cooling action.

Another object of the invention is to provide apparatus as described in the preceding object wherein the liquid within each header is directed to gravitate along an outlet path in heat exchange relationship with the ambient airflow to cool the liquid, and wherein each header is capable of collecting liquid therein to a level effecting sealing of the header from the atmosphere to permit simultaneous formation of the siphon action therewithin, and with the common vent manifold being interconnected with the headers so that the outlet liquid flow path of each header, before being sealed by liquid collected therein, is capable of admitting air to all of the headers to thereby assure that the siphon action in each header is established only upon collection of liquid in all the headers to levels sealing the associated outlet liquid flow path from the atmosphere so that the siphon actions in all the headers are established substantially simultaneously.

These and other objects and advantages of the present invention are specifically set forth in or will become apparent from the following detailed description of a preferred form of the invention when read in conjunction with the accompanying drawing, wherein:

FIG. 1 is a front elevational view of a portion of a liquid cooling apparatus and showing a multiple pass heat exchange unit of the type utilized in the present invention;

FIG. 2 is a fragmentary, front plan view of a plurality of units of the type illustrated in FIG. 1 with the headers of each unit shown in cross-section and in this case showing a single heat exchange water pass having a vertical riser system defined by a single pipe representing an alternative piping arrangement;

FIG. 3 is a view similar to FIG. 2 but illustrating a condition wherein siphoning action has been established in all of the headers;

FIG. 4 is an elevational cross-section view of another form of header construction utilizing the principles of the present invention.

Referring now more particularly to FIG. 1, there is illustrated a heat exchange unit 10 as utilized in a crossflow, combination wet-dry, liquid cooling tower. The cooling tower apparatus receives hot water, which for example may be derived from a condenser forming a part of a power plant or the like, and pumps the liquid into supply pipe 12 for collection within a collecting box 14.

Multiple pass heat exchanger unit 10 includes a series of finned heat exchanger tubes defining a vertical heat exchanger and riser system 16 extending between the underlying inlet collection box 14 and a closed, elevated header 18. Openings 20 in the bottom wall of header 18 open into vertically arranged, finned tubes 22 which extend in parallel relationship to the tubes of riser system 16 from the overhead header 18. The lower ends of tubes 22 open into an underlying liquid collecting structure 24 having an open side 26 and an opening 28 in the bottom thereof. Structure 24 is located adjacent box 14 with a side wall common therewith. Box 14 also has an opening 28 in the bottom wall thereof so that liquid collected within structure 24 and box 14 may gravitate directly into an underlying distribution basin 30 which is open to the atmosphere and has a plurality of orifices 32 therein.

Below distribution basin 30 there is provided an evaporative fill assembly (not shown) which is of conventional nature and, for example, may comprise a series of horizontally and vertically spaced, generally horizontally disposed slats carried by suitable corrosion resistant supporting grid so that water gravitating from orifices 32 contacts the slats and is broken up to form droplets of water for more efficient cooling thereof. The liquid cooling tower further includes a device (as for example a fan assembly not shown) of conventional nature for drawing a flow of ambient air horizontally across the region 38 in which riser system 16 and outlet tubes 22 are disposed, as well as parallel airflow to the same air mover from across the underlying fill assembly, in cooling, heat exchange relationship with liquid passing through the tubes of riser system 16, tubes 22 and subsequently gravitating through the evaporative fill assembly. Accordingly, riser system 16 and tubes 22 each define separate paths for carrying the hot liquid in indirect heat exchange relationship with the ambient airflow passing generally horizontally through region 38, while the evaporative fill structure brings the liquid into direct heat exchange relationship with the ambient, cooling airflow.

As illustrated in FIGS. 2 and 3, the liquid cooling apparatus includes a plurality of units 10 of identical construction located at approximately the same height. There is provided an associated, underlying collection structure 24, box 14, a distribution basin 30 for each of units 10 in the manner illustrated in FIG. 1, and a fill assembly of the type described is associated with each unit. The units 10 may be laterally aligned in adjacent relationship so that the regions 38 thereof, normally separated so that the incoming ambient airflow passes in parallel, separate paths through the regions 38, present a large heat exchange area for efficient cooling of liquid. Alternately, the units 10 may comprise separate radial segments of a liquid cooling apparatus extending around the bottom periphery of a natural draft hyperbolic stack. In either case, liquid to be cooled may be supplied to only selected ones of the units 10 if desired, in relation to varying external weather conditions as well as to create the most efficient distribution of the liquid across regions 38 for different rates of liquid flow.

The risers 16 of each unit which in this instance are shown as individual pipes are supplied with hot liquid flow in hydraulically parallel relationship with respect to tubes 22 from a common liquid supply associated with the cooling tower. A common vent manifold 34 is joined to each of the headers 18 in connecting relationship with openings 36 located above the normal level 35 of liquid collecting inside the headers as shown in FIG. 3.

During start-up and filling of the heat exchangers, air is inducted into the manifold 34 by virtue of upward air flow in the down-pass water tubes 22 of at least one of the units 10 (see FIG. 2) prior to the establishment of siphon action. Following siphon initiation, the manifold 34 is isolated from atmosphere since it is connected only to the plurality of units 18, therefore arriving at a partial vacuum condition similar to that which exists within manifold 34 and thus further providing a pressure-equalization function which maintains equal water flow distribution to the headers 18 during the normal operating mode of the total water system.

In operation, hot water is pumped from a common supply to a common header 13 which is in parallel relationship to the supply pipe 12, collection box 14, and riser system 16 of each of the units 10. The pumping means P of the water cooling apparatus forces the hot liquid upwardly in the riser systems 16 into the associated, elevated headers 18 wherein liquid collects for subsequent gravitation through the tubes 22 into the underlying collection structure 24.

Fluid may collect in each of the headers 18 to a level effecting sealing of the interior of the header from communication with the atmosphere through its associated outlet tubes 22. When any single header is completely sealed from the atmosphere continuing flow of liquid through that header will create a partial vacuum reducing internal air pressure to establish a siphoning action which assists in drawing the liquid through the riser 16 into the interior of that header. Such siphoning action is utilized to drastically reduce the power requirements for lifting the hot water into the headers 18.

The flow of hot water from the common supply to the several riser systems 16 will meet with different resistances in traveling to each of the risers 16. For instance, there will be substantially less resistance to flow to those units 10 disposed closer to the common liquid supply means, allowing these closer headers to fill with hot liquid faster than the remaining units 10. This condition is illustrated in FIG. 2 wherein the left and center units 10 have their headers filled with liquid to a level sealing the outlet openings 20 thereof from the atmosphere, while liquid has yet to fill the righthand unit 10. As is to be expected, this condition is normally encountered during the filling process of headers 18 at start-up of the cooling apparatus, and is more pronounced whenever the rate of liquid supply to the cooling apparatus is substantially less than the sum of the flow-carrying capabilities of units 10.

To preclude premature formation of siphoning action in the left and center units 10, vent manifold 34 equalizes air pressure within the interior of the headers 18 of all the units 10. Accordingly, prior to liquid sealing of openings 20 in the right-hand unit 10, airflow may be drawn through the outlet tubes 22 of at least the right hand unit 10 for subsequent flow to the interior of the other headers 18. In many applications, the water system may contain as many as 40, 50 or more separate units 10. The three units 10 shown in FIG. 2 are depicted only for illustrative purposes and not as a limitation on the number of units which would normally be employed in a commercial installation. Thus the interior of each header is still subject to full atmospheric pressure, and full siphoning action cannot be established in the left and center units at this time even though their headers are sealed from communication with the atmosphere through their associated outlet tubes 22. An air-water mixture flows through outlet tubes 22 of the center and left headers as filing of the right riser 16 continues, while air is supplied through the manifold 34, the header 18 and the tubes 22 of at least the right-hand unit 10.

As liquid continues to be fed from the common supply into the headers of the several units 10, all the headers will ultimately fill with liquid to levels sealing the outlet openings 20 thereof, which condition is illustrated in FIG. 3. Upon sealing of the outlet openings 20 of the last header to be filled, all of the headers are simultaneously sealed from communication with the atmosphere. Accordingly, siphoning action is established simultaneously in all of the headers 18 so that proper proportions of the hot liquid will be drawn through the headers of each unit. The utilization of closed manifold 34 thereby assures that no siphoning action can be established in any of the headers 18 until all of the outlet openings 20 of all of the headers are sealed. Prior to sealing of all the headers, airflow continues to be admitted to the interior of all of the headers through the common vent manifold 34 to prevent reduction of air pressure and subsequent formation of siphoning action in any of the units 10. For instance, in the condition illustrated in FIG. 2 air continues to be drawn through the outlet openings 20 of the right header 18 and into the left and center headers so that an air-water mixture passes through the outlet tubes 22 of the latter. Only upon filling of all of the headers 18 to the condition illustrated in FIG. 3 can siphoning action be established in any of the headers, and accordingly the siphoning action establishes substantially simultaneously in all of the headers to assist in drawing the hot liquid therethrough.

After gravitating through the outlet tubes 22 of each unit 10 in parallel relationship, the liquid collects in each of the associated underlying structures 24 to subsequently cascade across open side 26 thereof into distribution basin 30 and then onto an under-lying fill structure to further cool the liquid in direct, evaporative heat exchange relationship with the cooling airflow.

Another embodiment of header construction is illustrated in FIG. 4 wherein a closed, elevated header 118 forms a part of a unit 110 that is utilized in the same manner as that described with respect to units 10. In this connection there will be a plurality of units 110 and associated headers 118 which define separate cells of a cooling tower apparatus. Header 118 has a plurality of openings 120 in the bottom wall thereof and outlet tubes 122 secured therewith. A riser 116 is centrally disposed in header 118 and extends upwardly thereinto. A perforated baffle plate 140 has its lowermost edge secured around the upper rim of riser 116 and extends transversely across the interior of header 118 to be secured to the vertical side walls thereof. Baffle 140 splits the interior of header 118 into an upper turbulent chamber 142 and a lower quiescent distribution chamber 144, with perforations 146 in baffle plate 140 allowing fluid communication therebetween. A common header 134 which interconnects a plurality of units 110, communicates with the lower distribution chamber 144 through openings 136 in header 118.

In operation, fluid fed through riser 116 into upper chamber 142 is predistributed throughout header 118 by baffle 140 and brought to a relatively still condition prior to gravitation through perforations 146 into lower chamber 144. The arrangement and configuration of baffle 140 along with the relative size and location of perforations 146 assures a uniform distribution and collection of liquid within lower chamber 144 so that equal fluid flow through the numerous outlet tubes 122 results.

Upon liquid sealing of outlet openings 120, a condition is established for creating a siphon action within header 118 in the same manner as described above with respect to headers 18. The common vent manifold 134, operating in the same manner as manifold 34, precludes premature formation of a siphon action in any of the headers and thereby assures that siphoning action is established simultaneously in all of the headers 118 that are interconnected by the common vent manifold 134.

Having thus described the invention, what is claimed as new and desired to be secured by Letters Patent is:

1. In liquid cooling apparatus utilizing ambient airflow from the atmosphere to cool a liquid:
    a plurality of headers each having a liquid inlet;
    liquid outlet means associated with each header and defining separate paths for gravitation of liquid through said headers while in heat exchange relationship with said ambient airflow;
    liquid supply means communicating with said inlets for supplying liquid under pressure to said headers in parallel flow relationship,
    said outlet means of each header being open to the atmosphere and each header being operable to collect liquid therein to a level to effect sealing thereof from the atmosphere and thereby establish a siphoning action for drawing liquid through said inlet which assists said supply means in forcing said liquid through said inlet thereof for subsequent gravitation through said outlet means; and
    a common vent manifold interconnecting said headers to equalize air pressure therein, whereby said siphoning action in each of said headers is established only upon sealing of all of said headers from the atmosphere.

2. Apparatus as set forth in claim 1, wherein each of said headers is provided with an opening above the level of liquid normally collected within the header, said vent manifold being joined to the headers in interconnecting relationship to said openings of the headers.

3. Apparatus as set forth in claim 2, wherein each of said outlet means includes a plurality of spaced, generally parallel, vertical tubes carrying gravitating liquid from the associated header into indirect heat exchange relationship with said airflow, each of said headers being configured and located to cause liquid received therein to submerge the upper ends of the associated tubes to effect sealing of said header from communication with the atmosphere through said associated tubes.

4. Apparatus as set forth in claim 3, wherein a perforated baffle is provided within the interior of each of said headers dividing said interior into upper and lower fluid collecting chambers, said inlet of each header communicating with said upper chamber thereof, said outlet means and said openings communicating with said lower chamber of the associated header.

5. In liquid cooling apparatus utilizing ambient airflow from the surrounding atmosphere to cool the liquid:
   a plurality of multiple pass heat exchange units each including:
     an elevated, liquid collecting siphon header;
     inlet means and outlet means depending from said header and defining separate paths for respectively delivering and discharging liquid from said header in heat exchange relationship with said ambient airflow,
     said outlet means being open to the atmosphere and said header being capable of collecting liquid therein to a level to effect sealing thereof from the atmosphere and thereby establish a siphoning action for drawing liquid through said inlet means which assists in forcing said liquid thereinto;
   fluid supply means disposed below said headers and communicating with said inlet means of the units for supplying liquid under pressure to said headers in parallel flow relationship; and
   a common vent manifold interconnecting said headers for equalizing air pressure therewithin to establish said siphoning action of said units substantially simultaneously upon sealing of all of said headers from the atmosphere.

6. Apparatus as set forth in claim 5, wherein each of said outlet means includes a plurality of spaced, generally parallel, vertical tubes carrying gravitating liquid from the associated header into indirect heat exchange relationship with said airflow, each of said headers being configured and located to cause liquid received therein to submerge the upper ends of the associated tubes to effect sealing of said header from communication with the atmosphere through said associated tubes.

7. Apparatus as set forth in claim 6, wherein each of said inlet means includes a vertical riser having an upper end communicating with the associated header, the riser of each unit being spaced from said tubes thereof and carrying liquid in indirect heat exchange relationship with said airflow, each of said inlet means further including a fluid collecting box located directly below the associated riser and communicating with the lower end thereof.

8. Apparatus as set forth in claim 7, wherein said outlet means of each unit further includes an open structure underlying said tubes of the unit and configured to collect liquid gravitating from the associated header to a level submerging the lower ends of the associated tubes to seal the same from the atmosphere.

9. Apparatus as set forth in claim 8, wherein each of said units includes liquid distribution means underlying said box and said structure of the unit for receiving gravitating liquid, said structure being generally aligned at the same height adjacent the associated box, said box and said structure having openings in the lower portions thereof which permits liquid to gravitate to said distribution means.

* * * * *